United States Patent [19]

Schwartz et al.

[11] Patent Number: 4,523,891
[45] Date of Patent: Jun. 18, 1985

[54] PROPELLER PITCH CHANGE ACTUATION SYSTEM

[75] Inventors: Robert A. Schwartz, Vernon; Jerome G. Duchesneau, Andover, both of Conn.

[73] Assignee: United Technologies Corporation, Hartford, Conn.

[21] Appl. No.: 504,641

[22] Filed: Jun. 15, 1983

[51] Int. Cl.³ .............................................. B64C 11/38
[52] U.S. Cl. ..................... 416/157 R; 416/165
[58] Field of Search .................. 416/157, 48, 162, 49, 416/50, 165

[56] References Cited

U.S. PATENT DOCUMENTS

| | | | |
|---|---|---|---|
| 2,337,613 | 12/1943 | Martin | 170/163 |
| 2,378,938 | 6/1945 | McCoy | 170/163 |
| 2,388,276 | 11/1945 | McCoy | 170/163 |
| 2,426,007 | 8/1947 | Forsyth | 170/163 |
| 2,636,566 | 4/1953 | Jedrziewski | 170/160.2 |
| 2,640,555 | 6/1953 | Cushman | 170/160.21 |
| 2,738,022 | 3/1956 | Zwack | 170/160.19 |
| 2,910,126 | 10/1959 | Jedrziewski | 170/160.2 |
| 2,913,056 | 11/1959 | Farkas | 170/135.74 |
| 2,923,361 | 2/1960 | Best | 170/135.29 |
| 3,001,588 | 9/1961 | Fischer | 170/160.14 |
| 3,024,848 | 3/1962 | Chilman et al. | 170/160.32 |
| 3,068,943 | 12/1962 | Fischer | 170/160.2 |
| 3,170,521 | 2/1965 | Gaubis et al. | 170/160.29 |
| 3,212,586 | 10/1965 | Barnes et al. | 416/48 X |
| 3,240,275 | 3/1966 | Bennett | 416/157 R X |
| 3,263,754 | 8/1966 | Belliere | 416/157 R |
| 3,589,830 | 6/1971 | Mogren | 416/1 |
| 4,061,440 | 12/1977 | Belliere | 416/157 R |

FOREIGN PATENT DOCUMENTS 629540 9/1949 United Kingdom ............ 416/157 R

Primary Examiner—Everette A. Powell, Jr.
Attorney, Agent, or Firm—John Swiatocha

[57] ABSTRACT

A propeller pitch change actuation system comprises an input actuator (230) driving a ball screw (200). Operation of the ball screw rotates a torque tube (140) about the longitudinal axis thereof to drive a screw 145 and control valve 120 which controls the pressurization of pitch change actuator (87). Actuator (87) is supplied with hydraulic fluid through the interior of the torque tube.

14 Claims, 2 Drawing Figures

PROPELLER PITCH CHANGE ACTUATION SYSTEM

TECHNICAL FIELD

This invention relates generally to aircraft propeller systems and more particularly to such propeller systems of the variable pitch variety.

BACKGROUND ART

Typically, variable pitch aircraft propeller systems include a plurality of propeller blades mounted for pivotal (pitch adjusting) movement about the longitudinal axes thereof to a rotary hub driven by the aircraft's engine. The hub usually includes a chamber interiorly thereof, the chamber accommodating a hydromechanical pitch actuation system including an hydraulic actuator having an output member such as a piston or the like connected to a movable pintle or cam. The cam engages a follower operably connected to a root portion of the blade. Energization of the actuator moves the cam and hence the follower, thereby pivotally adjusting the pitch of the aircraft blades to, for example, control the speed of the propeller and therefore the operation of the aircraft. Such aircraft propeller actuation systems are shown extensively in the prior art, such as for example, in U.S. Pat. No. 3,068,943 to Fischer.

It will be recognized by those skilled in the art that such hyromechanical propeller pitch actuation systems must, in the normal operation thereof, accurately perform a number of different mechanical functions. For example, the system must provide relatively precise control of the admission of hydraulic fluid to the actuator and the drainage of such fluid therefrom. The system must also provide actuation and deactuation signals to the actuator from the system's controller and provide a "pitch lock" function for maintenance of blade pitch setting in the face of a malfunction in the actuation system's hydraulics. For enhanced compactness, minimization of weight, simplicity of structure, ease in assembly and economy of manufacture, it is desirable that the mechanical functions of the actuation system noted herein be performed by as few a number of component parts as possible. Accordingly, simplification of prior art propeller pitch change actuation systems has been continually sought. Improvements in the accuracy of prior art pitch change actuation systems (the ability of the systems to maintain desired blade pitch settings determined by the system's controller) have also been sought. However, a number of characteristics inherent in such pitch change actuation systems have been inimical to the ability of the systems to accurately set and maintain blade pitch. For example, in a β (pitch angle set in response to throttle lever position rather than engine speed governor operation) mode of operation, the pitch change actuation system must accurately input pitch change signals from the controller to the pitch actuator and feed signals indicative of actual blade pitch setting back to the controller. Typically, such feedback signals have been provided to the controller by such mechanisms as feedback rods, levers or other mechanical assemblies. Such mechanisms are often characterized by operational backlash due to normal manufacturing tolerances and susceptibility to thermal expansion and contraction. These backlash and thermal effects in addition to changes in length of system components due to the normal loading thereof, all detract from the accuracy with which blade pitch may be set and held by the system under beta operating conditions. Furthermore, the hydraulics associated with such systems have been difficult at best to index (calibrate) when the pitch actuation system is being assembled within the aircraft.

DISCLOSURE OF INVENTION

It is therefore a principal object of the present invention to provide a propeller pitch change actuation system characterized by enhanced compactness, simplicity and economy resulting from a minimization of required component parts.

It is another object of the present invention to provide a propeller pitch change actuation system characterized by enhanced accuracy resulting from improved system calibration and signal input and feedback capabilities and minimized susceptibility to backlash and thermal effects.

These and other objects, which will become more readily apparent from the following detailed description taken in connection with the appended claims and accompanying drawings, are attained by the present invention. The present invention includes a fluid mechanical pitch change actuator operably connected to the propeller blades, a fluid mechanical input actuator operably connected to a pitch control system and a fluid conduit or torque tube connecting the pitch change and input actuators and providing the pitch change actuator with an input signal indicative of the desired pitch setting and supply fluid to power the pitch change actuator to the desired pitch setting thereof. The torque tube also provides an accurate feedback signal indicative of blade pitch setting from the pitch change actuator to the input actuator from which this signal is conveniently transmitted back to a fluid mechanical pitch controller. In the preferred embodiment, the pitch change actuator comprises a piston connected to the propeller blades at root portions thereof and reciprocally moveable within a cylinder which includes an integral control valve housing. A screw threaded into the piston carries a control valve element received within the housing, the control valve being set by the torque tube, the position of which is controlled by the input actuator. Connection of the screw and control valve element to the pitch change actuator piston provides an automatic nulling of the valve by movement of the piston. The screw provides an effective single-component pitch-lock to prevent unwanted variations in blade pitch in the event of hydraulic failure of the pitch change actuator. The input actuator is both signaled and energized by a pitch control system and includes a reciprocally moveable piston carrying a ball screw therewithin, the ball screw being connected to the torque tube by a quill-spline connection which accommodates misalignments between those two components. Reciprocations of the input actuator piston causes a rotation of the ball screw and hence the torque tube, thereby rotating the screw and control valve in the pitch change actuator for the controlled pressurization thereof. A flexible connection in a housing supporting the ball screw and torque tube accommodates misalignments between these components and the propeller hub.

BEST MODE FOR CARRYING OUT THE INVENTION AND INDUSTRIAL APPLICABILITY THEREOF

Figure 1:
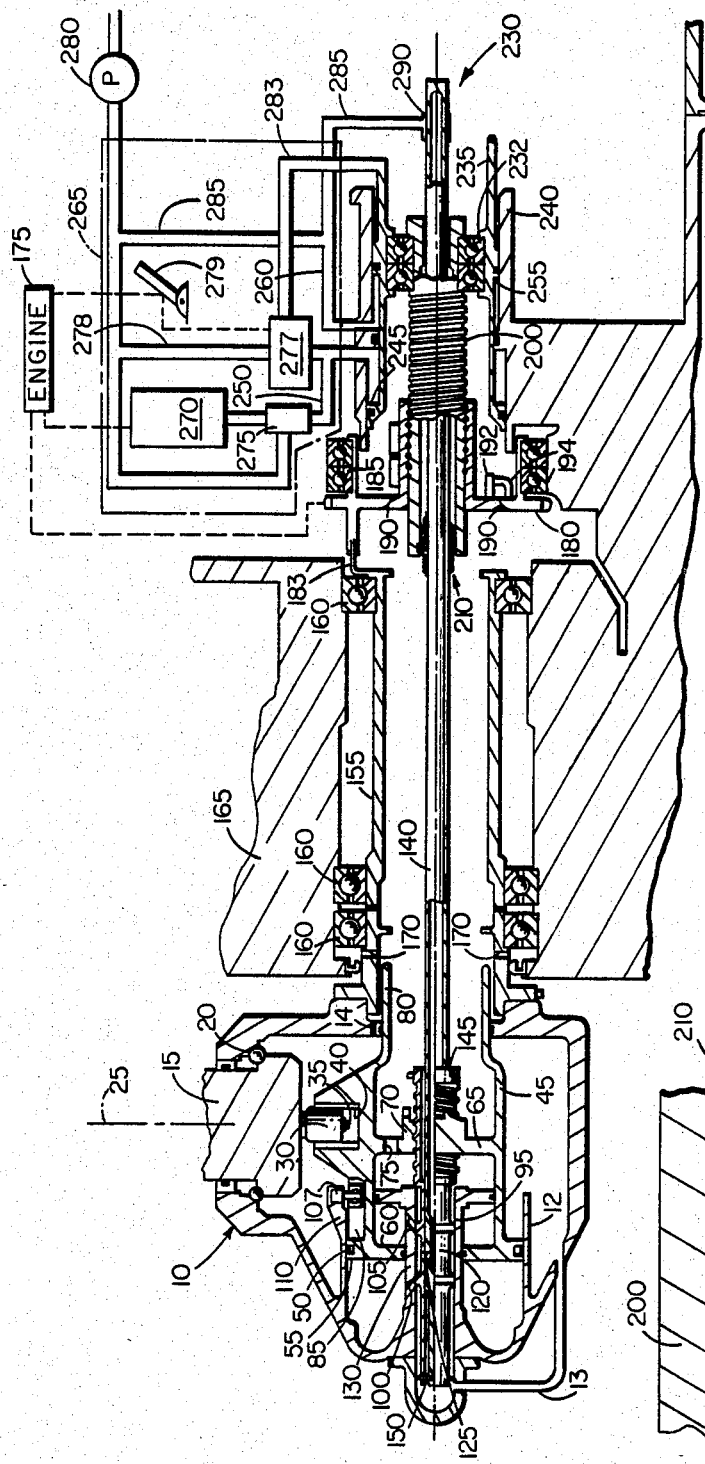
FIG. 1 is a partially sectioned elevation of the propeller pitch adjusting system of the present invention, portions thereof being broken away to show details of construction.

Referring to the drawing, particularly to FIG. 1 thereof, the present invention is directed to a system for setting (adjusting) the pitch of the blades of a variable pitch propeller system for propeller driven aircraft and the like. The propeller system includes a hub 10 provided with integral cylinder 12, fluid return conduit 13 and fluid return port 14. While coonduit 13 is illustrated as a discrete tube, it will be understood from the remainder of the description that the fluid handling function of conduit 13 may be achieved by any of various equivalent internal porting schemes as will suggest themselves to those skilled in the art. Hub 10 has a plurality of propeller blades 15 mounted thereto on bearings 20 so that the blades are pivotably adjustable in pitch about the longitudinal axes 25 thereof. For clarity, FIG. 1 illustrates only the root portion of a single such blade, it being understood that the present invention is suitable for propellers with any number of blades of any prescribed airfoil shape.

Blade 15 includes at the root end thereof, an eccentric roller 30 mounted on a pintle (axle) 35. The roller is received within a cam slot 40 of a desired shape provided in piston (first output member) 45. Piston 45 also includes a forward bulkhead 50 provided with faces 55 and 60 which are selectively pressurized with fluid such as hydraulic oil in a manner to be described in detail hereinafter to move piston 45 and hence propeller blades 15 to desired pitch settings. Piston 45 is also provided, generally centrally thereof, with an interior bulkhead 65 including a threaded portion 70 and a fluid return port 75 as well as an aft, skirt portion 80 and forward longitudinal slot 85.

Piston 45 is reciprocally moveable within cylinder 12, the piston and cylinder comprising a pitch change actuator. A medial portion of cylinder 12 comprises a valve housing 95 having a pair of outlet ports 100 and 105 therethrough. Hydraulic fluid pressurizing the interior of cylinder 12 and piston face 55 through port 100, causes movement of the piston to the right wth a corresponding blade pitch adjustment. Hydraulic fluid pressurizing the interior of cylinder 12 and piston face 60 through port 105 causes movement of piston 45 to the left with a corresponding pitch change adjustment in the propeller blades.

Alignment of piston 45 with cylinder 12 in hub 10 is maintained by the engagement of the radially outer portion of bulkhead 50 with cylinder 12, the engagement of piston skirt 80 with the left end of hub 10 and the engagement of roller 107 with the interior of groove 85 in piston 45 and the interior of groove 110 in the wall of cylinder 12.

Hydraulic fluid is selectively valved to outlet ports 100 and 105 through control valve element 120 which includes radial passage 125 communicating with annular recess 130 selectively registrable with ports 100 and 105 as the valve element is longitudinally positioned.

The interior portion of valve element 120 is formed integrally with and comprises an end portion of conduit means (torque tube) 140 while the outer portion of the valve element is formed integrally with a screw 145, the inner and outer valve element portions, and hence screw 145 and torque tube 140 being connected at the left-hand end of the assembly by any suitable fastener 150.

Torque tube 140 is received within hollow shaft (housing) 155 which rotates with hub 10. Shaft 155 is mounted on bearings 160 supported on stationary frame 165 and includes port 170 by which hydraulic fluid from the pitch change actuator is returned to a sump (not shown). Shaft 155 provides rotational input power to hub 10 from an aircraft engine 175, the shaft being connected to the engine as for example, by gear 180 connected to the shaft as by extension 183 thereof. Gear 180 is mounted to the stationary frame on bearings 185, and includes flexible (pivotable) joints 190 therearound such as ball and socket or clevis joints which accommodates angular misalignments of the shaft with the torque tube and components connected thereto. Gear 180 rotationally drives a ball screw 200 by spline (192)-key (194) connections therebetween, the spline being formed in a flange on the ball screw housing and the key extending from a radially outer portion of the gear.

Figure 2:
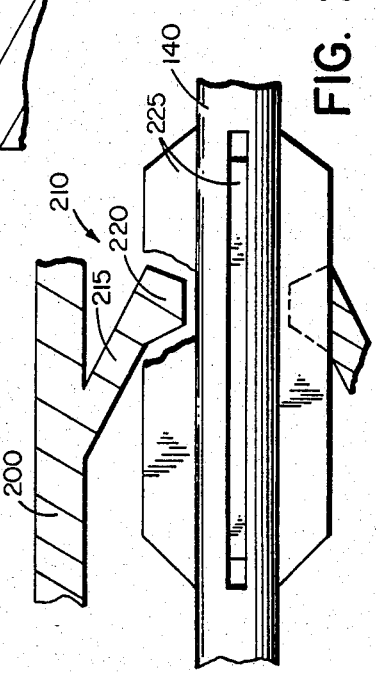
FIG. 2 is an enlarged, fragmentary, partially sectioned view of a connection between a ball screw and torque tube employed in the system of FIG. 1.

The right-hand end portion of torque tube 140 is received within the ball screw, being connected thereto by flexible joint 210 comprising quills 215 extending radially inwardly from the interior of the ball screw and having radially inner end portions 220 received betwwen splines 225 extending radially outwardly from the surface of torque tube 140 (see FIG. 2). Those skilled in the art will appreciate that such a joint allows a pivoting of the torque tube within the interior of the ball screw thereby accommodating longitudinal, angular and radial misalignments of those components.

Ball screw 200 is mounted within the interior of input actuator 230 on bearings 232 fixed to the interior of piston (second output member) 235 whereby the ball screw and hence shaft extension 183 and torque tube 140 are free to rotate within this piston. Piston 235 is reciprocably received within cylinder 240 which, as shown in FIG. 1, may comprise an extension of stationary frame 165. Piston 235 is pressurized at a first surface 245 thereof with metered hydraulic fluid provided thereto through conduit 250, and at a second surface 255 with hydraulic fluid at supply pressure through conduit 260. By way of example, piston 235 may comprise what those skilled in the art will recognize as a "half area" servo piston wherein surface 245 is approximately twice the area of surface 255 so that the fluid forces on the piston balance one another when the metered pressure is one-half the value of the supply pressure. Thus, the piston is urged to the right by a net fluid force when the metered pressure in conduit 250 is dropped to below one-half supply pressure and to the left when the metered pressure is increased to a value greater than one-half supply pressure. Pressurization of piston 235 is controlled by any of various known fluid mechanical pitch control systems 265, such a system typically including a speed governor 270 mechanically connected to a pilot valve 275 wherein the pilot valve, in response to operation of the governor at greater or less than desired speed, is adjusted by the governor to adjust metered fluid pressure within conduit 250, thereby setting piston 235 to a position corresponding to the desired propeller speed. Control system 265 may include a $\beta$-control subsystem 277 which, when activated, meters hydraulic fluid from line 278 to actuator 230 in direct response to the setting of power lever 279 rather than in response to governor 270. Such $\beta$-control subsystems are known in the art and, as the entire pitch control system 265, forms no part of the present invention. A pitch angle feedback signal to subsystem 277 as provided by arm 283 carried by piston 235 and longitudinally movable therewith.

Hydraulic fluid is provided to control system 265 by pump 280 drawing fluid from a suitable sump such as a remote sump (not shown). Alternatively, the entire pitch change actuation system may be disposed in an environment of hydraulic fluid so that the pump may draw fluid from the pump's immediate surroundings. Fluid at supply pressure is provided by pump 280 to the interior of torque tube 140 through conduit 285 and transfer bearing 290, the torque tube ultimately providing the fluid to valve element 120, valve housing 95 and the pitch change actuator piston and cylinder 45 and 90, respectively.

Operation of the pitch adjustment system of the present invention is as follows. As set forth hereinabove, variation in propeller speed from desired speed will cause governor 270 to adjust the setting of pilot valve 275 thereby adjusting the pressure of metered fluid in conduit 250. Such an adjustment effects a corresponding adjustment of the relative positioning of input actuator piston 235 within cylinder 240. The adjustment in position of piston 235 effects a similar adjustment in the longitudinal position of ball screw 200. As the ball screw is moved longitudinally, the engagement thereof with shaft extension 190 effects a rotation of the ball screw about its longitudinal axis. The connection of the ball screw to torque tube 140 at connection 210 causes a similar rotation of the torque tube about its longitudinal axis and a correspondingly similar rotation of screw 145 within threaded portion 70 of pitch change actuator piston 45. Such a rotation of screw 145 adjusts the longitudinal position of valve element 120 thereby effecting a registration of passage 125 and annular recess 130 with either of ports 100 or 105. As set forth hereinabove, in the event that port 105 is pressurized with fluid, piston 45 is urged to the left, thereby effecting an adjustment in blade pitch by way of the connection of roller 30 on the blade root with cam slot 40 in the piston. Such positioning of valve element 120 within housing 95 also allows the left-hand portion of cylinder 90 to drain through port 100, return passage 13, hub port 14 and finally ports 170 in shaft 155. In the event valve element 120 is positioned to register recess 130 with port 100, the left-hand portion of the interior of cylinder 12 is pressurized, thereby moving piston 45 to the right, draining the right-hand portion of the cylinder through port 105, piston port 75 and finally port 170 in housing 155. Movement of piston 45 in response to the pressurization thereof through either of ports 100 or 105 causes a similar movement of valve element 120 due to the connection of screw 145 with threaded portion 70 of the piston whereby the valve is automatically nulled by such piston movement. Should further pitch adjustment be required to achieve the desired setting, the governor makes further adjustment in the setting of pilot valve 275 thereby further adjusting piston 235, ball screw 200, torque tube 140 and valve element 120 for further actuation of piston 45 and pivoting of the blades about their longitudinal axes, each such adjustment being accompanied by nulling of the valve element. When $\beta$-control of propeller pitch is desired, $\beta$-control subsystem 27 is energized and the admission of hydraulic fluid to surface 245 of piston 235 is controlled by power lever 279 rather than governor-controlled pilot valve 275. However, under $\beta$-control conditions the pitch actuation system of the present invention functions as described hereinabove.

It will be seen that the pitch adjustment system of the present invention overcomes many of the disadvantages associated with prior art pitch adjustment systems. It will be appreciated that the single torque tube provides not only a means of providing a fluid signal to initiate actuation of the pitch change actuator but also provides a conduit for the fluid which powers the actuator. Furthermore, the torque tube provides a positive, solid connection between the input and pitch change actuators thereby minimizing inaccuracies associated with manufacturing tolerances and changes in length due to loading and thermal effects on components of the system. Those skilled in the art will appreciate that the minimization of such backlash and component length changes not only enhance the accuracy of the system under conditions of normal governor control of blade pitch, but also under $\beta$-control conditions. Under such conditions, a $\beta$ pitch angle signal may be both accurately input to, and fed back from the pitch change actuation system at the input actuator, proximally to pitch control system 265. Thus, with the present system no long feedback links or other components subject to the inherent inaccuracies discussed hereinabove are required. It will also be appreciated that the connection of screw 145 with the interior of piston 45 provides a simple, yet effective pitch-lock whereby the pitch of blade 15 will be maintained despite loss of hydraulic control of the pitch change actuator. Furthermore, in assembly, the system of the present invention may be readily indexed by setting the blades to a select pitch, setting the input actuator piston to a select position, and coupling the pitch change and input actuator pistons with the torque tube. The provision of ball screw 200, screw 45 and torque tube 140 minimize inaccuracies in the operation of the pitch control system due to backlash within the system. The flexible connections between the torque tube and ball screw and between the drive shaft and ball screw readily accommodate longitudinal, angular and radial misalignments between the various system components. The unitary structure of the interior of the valve element with the end of the torque tube further minimizes the number of individual component parts required and thus, further enhances the compactness, simplicity, and economy of the system.

Having thus described the invention, what is claimed is:

1. A system for adjusting the pitch of a variable pitch propeller, said propeller comprising a plurality of blades (15), each of said blades being mounted to a hub (10) and operably connected to a first output member (45) associated with a fluid driven pitch change actuator (87) pressurizable with fluid from a source thereof, movement of said first output member effecting an adjustment in blade pitch, said system being characterized by:
   an input actuator (230) having a second output member (235);
   a valve (95 and 120) disposed within said hub, adjacent to said pitch change actuator and in fluid communication therewith for selectively pressurizing said pitch change actuator to effect a desired adjustment in blade pitch; and
   a conduit (140) operatively connecting said second output member to said valve for transmitting movement of said second output member to said valve for selectively positioning the valve and for providing through the interior of said conduit means, fluid from said source to said valve and said pitch change actuator.

2. The system of claim 1 characterized by:
said second output member (235) being rectilinearly reciprocable within said input actuator;
first means (200) connected to said second output member for converting rectilinear displacement thereof to rotational displacement;
second means (145) being operatively connected to said first means for converting rotational displacement thereof to a rectilinear displacement;
said second means being connected to said first means by said conduit means (140); and
said valve (95 and 120) being connected to said second means and driven rectilinearly thereby for said selective positioning of said valve.

3. The system of claim 2 characterized by said input actuator (230) including a cylinder (240) and said second output member (235) comprising a piston disposed within said cylinder, select fluid pressurization of said piston effecting rectilinearly reciprocable movement thereof, said first means (200) comprising a ball screw connected to said piston for rectilinear movement therewith.

4. The system of claim 3 characterized by said ball screw (200) being mounted interiorly of said input actuator piston (235) on bearings (230 and 232) which allow rotation of said ball screw with respect to said input actuator piston.

5. The system of claim 2 characterized by said second means (145) comprising a screw and said valve (95 and 120) including a movable valve element (120) fixed to said screw.

6. The system of claim 5 characterized by said first output member (45) of said pitch change actuator comprising a piston disposed in said hub (10), select fluid pressurization of said piston effecting rectilinearly reciprocable movement thereof within said hub, said valve (95 and 120) being disposed interiorly of said hub and including said moveable valve element (120) having a fluid passage (125 and 130) therein and being disposed in a housing (95), said housing being stationary with respect to said hub and including a pair of outlet ports (100 and 105) therein, each of said outlet ports communicating with an opposite face (55 and 60) of said piston, rectilinear movement of said valve element effecting select communication between said fluid passage in said valve element and said outlet ports to effect said select fluid pressurization of said piston.

7. The system of claim 6 characterized by said pitch change actuator piston (45) being disposed within a cylinder (12), said cylinder being integral with said propeller hub (10).

8. The system of claim 7 characterized by said valve housing (95) comprising an inner wall of said cylinder (12).

9. The system of claim 2 characterized by said second means (145) being connected to said first output member (45) whereby movement of said first output member resulting from the select pressurization thereof effects a corresponding movement of said second means and said valve means (95 and 120) for the nulling thereof.

10. The system of claim 2 characterized by said conduit (140) comprising a tubular shaft having first and second end portions connected to said first and second means (200 and 145), respectively.

11. The system of claim 10 characterized by said second means (145) comprising a hollow screw receiving said conduit means (14) therewithin for providing fluid communication between said valve (95 and 120) and said conduit (140), said conduit at said first end portion including a fluid inlet (290) in communication with said fluid source.

12. The system of claim 2 characterized by said conduit (140) being connected to said first means (200) by a flexible connection (210) accommodating longitudinal misalignments of said conduit and first means.

13. The system of claim 12 characterized by said flexible connection (210) comprising a quill (215) and spline (225) connection.

14. The system of claim 2 characterized by means (155 and 180) connected to said hub for supporting said first means (200) and said conduit means (140), said supporting means including a flexible joint (190) therein for accommodating longitudinal misalignments between said hub (10) and said conduit means (140) and said first means (200).

* * * * *